E. L. JOHNSON.
AUTOMOBILE SIGNAL.
APPLICATION FILED JUNE 8, 1916.
1,225,714.
Patented May 8, 1917.
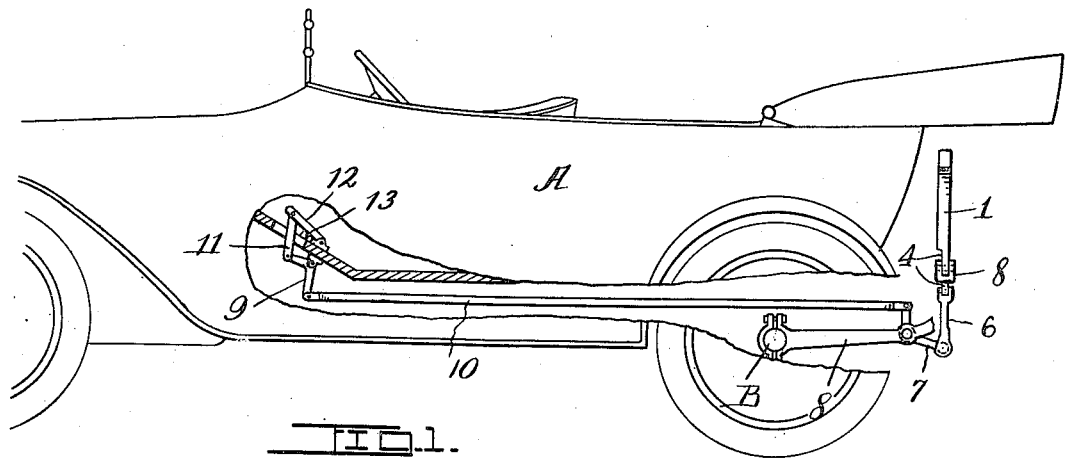
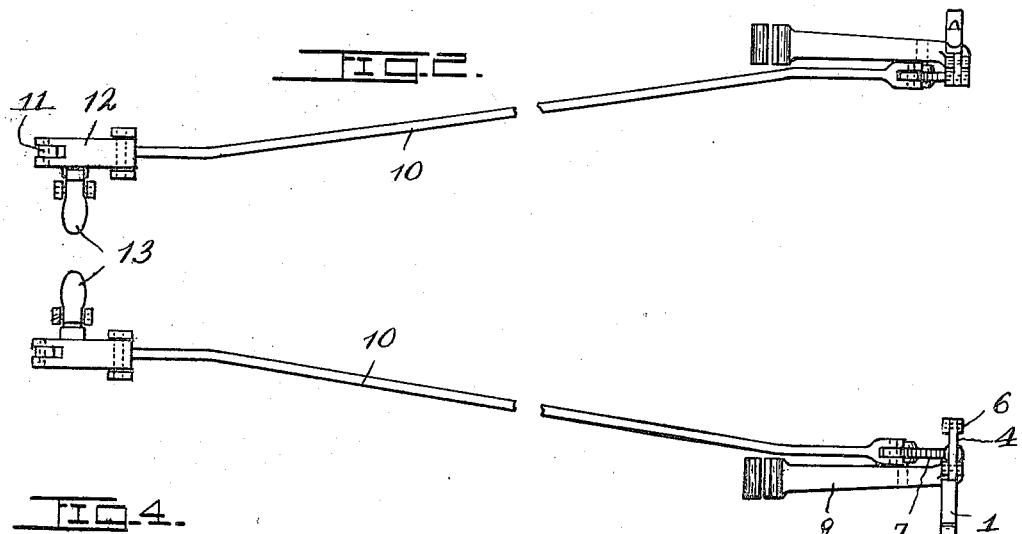
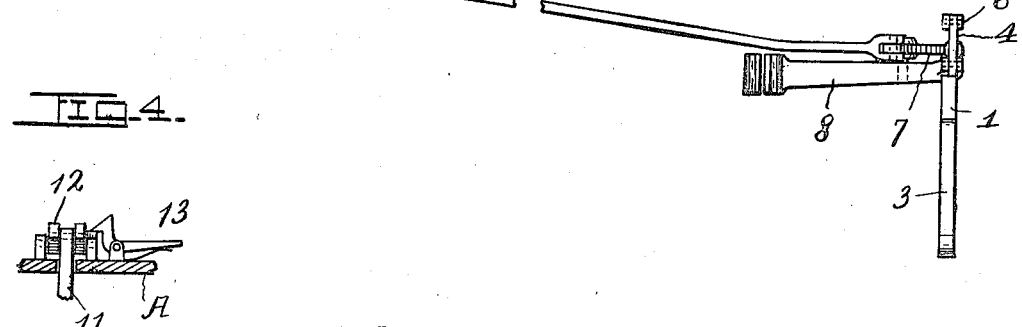
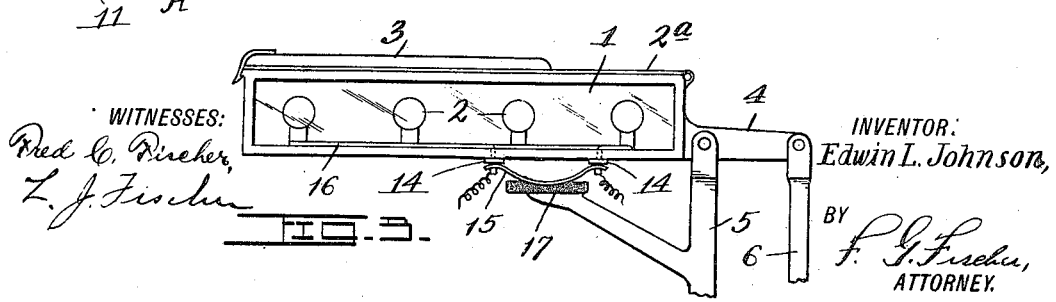
WITNESSES:
Fred C. Fischer
L. J. Fischer
INVENTOR:
Edwin L. Johnson,
BY
F. G. Fischer,
ATTORNEY.

UNITED STATES PATENT OFFICE.

EDWIN L. JOHNSON, OF KANSAS CITY, MISSOURI.

AUTOMOBILE-SIGNAL.

1,225,714. Specification of Letters Patent. Patented May 8, 1917.

Application filed June 8, 1916. Serial No. 102,456.

*To all whom it may concern:*

Be it known that I, EDWIN L. JOHNSON, a citizen of the United States, residing at Kansas City, in the county of Jackson and State of Missouri, have invented certain new and useful Improvements in Automobile-Signals, of which the following is a specification.

My invention relates to signals for automobiles, and other vehicles, and one object is to provide a simple and inexpensive device of this character for indicating the direction in which a car equipped with the signal is about to turn.

The invention is adapted for use both in the daytime and at night, as it embodies signals which can be seen in the daytime and is equipped with illuminating means, so that it can be readily distinguished at night.

The signals are disposed adjacent the right and left sides of the car and at the rear of the latter, and adapted to be actuated by the driver who throws the signal at the right side to operative position when he is about to turn to the right and throws the left signal to operative position when about to turn to the left.

In order that the invention may be fully understood, reference will now be made to the accompanying drawing, in which:

Figure 1 is a broken side elevation of a car equipped with my invention.

Fig. 2 is a broken plan view of the important mechanical elements of the invention.

Fig. 3 is a side elevation of one of the signals and its electrical equipment.

Fig. 4 is a detail of a foot lever and a latch constituting parts of the invention.

Referring now in detail to the various parts, A designates an automobile equipped with my signals and their actuating mechanism.

Each signal comprises a case 1 and lamps 2 whereby the glass sides of the case may be illuminated at night, so that the signal can be seen from the front and rear. Said case 1 has a lid 2ª, so that access may be had to the lamps 2 and a weight 3 for automatically adjusting it to horizontal position after a foot lever hereinafter referred to has been released.

An arm 4, supporting the case 1, is fulcrumed upon a bracket 8 and connected to a link 6, pivoted at its lower end to a bell-crank 7, mounted upon said bracket 8, which is secured to the rear axle housing B of the automobile. The bell-crank 7 is connected to a forward bell-crank 9 by a connecting rod 10, extending beneath the floor of the car. The forward bell-crank 9 is pivoted to a link 11 extending upwardly through a slot in the floor of the car and pivoted to a foot lever 12.

Said foot lever 12 is normally held in a depressed position by a foot latch 13 to hold the case 1 in raised position. As disclosed by Fig. 2, the foot latches 13 are arranged adjacent each other and within convenient reach of the foot of the driver, who, when about to turn to the right or left, actuates the proper latch 13 to release the lever 12 and allow the weight 3 on the respective case 1 to depress the same to a horizontal position, as disclosed by Fig. 3.

As the case 1 swings to horizontal position it closes a circuit breaker consisting of two terminals 14 and a spring contact 15. The terminals 14 are secured to the underside of the case 1 and connected to the lamp terminals by a conductor 16. The spring contact 15 is supported by insulation 17 on an arm of the bracket 8, and may be arranged in the usual tail-light circuit of the car. The spring contact 15 also acts as a yieldable stop to the case when the same swings downward to operative position.

After the proper signal has been lowered to horizontal position and the turn is made, said signal is restored to vertical position by depressing its respective foot lever 12, which is then automatically engaged by its latch 13 and held in depressed position until again released.

From the foregoing description, it is apparent that I have produced a signal embodying the features of advantage above enumerated, and whereby accidents arising from cars colliding with each other on turns are avoided, and while I have shown and described the preferred form of my invention, I reserve the right to make such changes in the construction, combination, and arrangement of parts as properly fall within the spirit and scope of the claim.

Having thus described my invention, what I claim and desire to secure by Letters Patent, is:

In an automobile signal, a bracket having a vertical arm and a laterally extending arm, a signal having an end arm projecting therefrom and pivoted to said vertical arm, a horizontal member secured to the upper end of the laterally extending bracket arm, a depending link pivoted to the outer end of the signal arm, contacts for the lamp extending beyond the bottom of the signal, and a single curved flat contact spring connected at its center to the horizontal member and formed to engage said signal at its ends, said spring serving to cushion the movement of the signal when the latter is moved into display position.

In testimony whereof I affix my signature, in the presence of two witnesses.

EDWIN L. JOHNSON.

Witnesses:
WILLIAM F. POTTER,
F. G. FISCHER.